United States Patent [19]

Ono et al.

[11] Patent Number: 5,013,896

[45] Date of Patent: May 7, 1991

[54] CASHIERLESS CHECKOUT SYSTEM USING CUSTOMER PASSCARD

[75] Inventors: Tsutomu Ono; Masaru Nogami, both of Odawara, Japan

[73] Assignee: NCR Corporation, Dayton, Ohio

[21] Appl. No.: 269,813

[22] Filed: Nov. 9, 1988

[30] Foreign Application Priority Data

Dec. 28, 1987 [JP] Japan ............................... 62-330403

[51] Int. Cl.[5] ............................................ G06F 15/21

[52] U.S. Cl. .................................. 235/381; 235/383; 235/375

[58] Field of Search ............... 235/375, 380, 381, 382, 235/382.5, 383, 385, 419, 462; 364/400, 401, 405; 186/59, 60, 61

[56] References Cited

U.S. PATENT DOCUMENTS

| | | | |
|---|---|---|---|
| 3,519,993 | 7/1970 | Sakai et al. | 235/382 |
| 3,531,625 | 9/1970 | Mizuta et al. | 235/382 |
| 3,560,932 | 2/1971 | Morita | 235/382 |
| 3,675,206 | 7/1972 | Osaki et al. | 235/382 |
| 3,716,697 | 2/1973 | Weir | 235/383 |
| 3,935,933 | 2/1976 | Tanaka et al. | 235/383 |
| 4,068,213 | 1/1978 | Nakamura | 235/381 |
| 4,108,363 | 8/1978 | Susumu | 235/383 |
| 4,373,133 | 2/1983 | Clyne et al. | 235/385 |
| 4,521,677 | 6/1985 | Sarwin | 235/383 |
| 4,578,567 | 3/1986 | Granzow et al. | 235/382 |
| 4,583,083 | 4/1986 | Bojasky | 186/59 |
| 4,583,619 | 4/1986 | Fry | 186/59 |
| 4,676,343 | 6/1987 | Humble et al. | 235/383 |
| 4,679,154 | 7/1987 | Blanford | 235/383 |
| 4,686,357 | 8/1987 | Douno et al. | 235/419 |
| 4,724,306 | 2/1988 | Kitaoka et al. | 235/383 |
| 4,731,575 | 3/1988 | Sloan | 235/381 |
| 4,775,782 | 10/1988 | Mergenthaler et al. | 186/61 |
| 4,787,467 | 11/1988 | Johnson | 235/385 |
| 4,866,661 | 9/1989 | de Prins | 235/385 |
| 4,894,522 | 1/1990 | Elliott | 235/462 |

FOREIGN PATENT DOCUMENTS

| | | |
|---|---|---|
| 899019 | 6/1984 | Belgium . |
| 167860 | 1/1986 | European Pat. Off. . |
| 169649 | 1/1986 | European Pat. Off. . |
| 2596553 | 10/1987 | France . |
| 60-263295 | 5/1984 | Japan . |
| 2119988 | 11/1983 | United Kingdom . |
| 2161631 | 1/1986 | United Kingdom . |
| 87/00322 | 1/1987 | World Int. Prop. O. . |
| 8804813 | 6/1988 | World Int. Prop. O. . |

*Primary Examiner*—Stuart S. Levy
*Assistant Examiner*—Robert A. Weinhardt
*Attorney, Agent, or Firm*—Wilbert Hawk, Jr.; Albert L. Sessler, Jr.; George J. Muckenthaler

[57] ABSTRACT

A checkout system includes a plurality of purchased goods entry terminals having a scanning section, a display section, a printing section and a passcard issuing section for issuing a passcard that includes customer identification and an amount of money, a pluralilty of money receiving terminals separated from the entry terminals and having a passcard read/write section, a money receiving section, a printer, and a displaying section, the read/write section recording the reception of money for goods, an exit gate control unit having a passcard checker for checking the payment of money and an exit gate controller to allow customers to pass through the exit gate, and a control and processing unit (CPU) coupled to the entry terminals, the money receiving terminals and the exit gate control unit to assure correct payment of money for the purchased goods.

8 Claims, 5 Drawing Sheets

CASHIERLESS CHECKOUT SYSTEM USING CUSTOMER PASSCARD

BACKGROUND OF THE INVENTION

The present invention relates to a system for checking out goods or merchandise in a supermarket or like business entity without the aid or benefit of a cashier or checkout clerk.

As prior art of the cashierless checkout system, there has been proposed an invention disclosed in Japanese Patent Application No. 119042/84, which is a patent application submitted from Omron Tateisi Electronics Co., under the name of R. Koji, entitled "Self Checkout Gate". This patent application discloses a checkout gate comprising a scanning unit which permits the customers to scan their purchased goods, a purchased goods bin into which the purchased goods are deposited, a money settling device through which the customers pay money for their purchased goods, and a shutter section adapted to open a shutter of an outlet of the purchased goods bin at the completion of the payment of money to permit the customers to take out their purchased goods.

One drawback of the above-mentioned prior art is that the customers can not take out their purchased goods for a period of time even though they have paid the money for such goods. The shutter section of this checkout operation takes a lot of time and causes a jammed condition at the checkout gate. An alternative proposal has been made wherein such jamming at the checkout gate or other time-consuming operations are relieved by separating the entry of purchased goods from the money receiving operation. However, even in this latter proposal, the separation of the purchased goods entry from the money receiving operation causes another problem in that the amount of money received is not always assured or correct.

Additional documentation in the area of automated checkout systems includes U.S. Pat. No. 3,519,993, issued to K. Sakai et al. on July 7, 1970, which discloses an automatic ticket gate providing for bidirectional passage and includes entrance and exit ticket slots, a ticket reader, and a passenger direction detection circuit.

U.S. Pat. No. 3,531,625, issued to Y. Mizuta et al. on Sept. 29, 1970, discloses an automatic ticket gate for receiving a plurality of tickets in rapid succession, for examination of the tickets with respect to validity and for returning the tickets to the owners.

U.S. Pat. No. 3,560,932, issued to T. Morita on Feb. 2, 1971, discloses an automatic ticket examining system and gate control system including a plurality of ticket gates wherein at least one gate performs all the functions of a complete gate, that is, receiving a ticket, checking its validity, opening or closing the gateway, and returning or collecting the ticket.

U.S. Pat. No. 3,675,206, issued to K. Osaki et al. on July 4, 1972, discloses an automatic ticket gate wherein information on a ticket is read and depending upon whether the information is valid or not, allows or disallows the ticket owner to pass through the gate, such gate permitting a predetermined number of misreadings of the ticket.

U.S. Pat. No. 3,716,697, issued to S. M. Weir on Feb. 13, 1973, discloses an automatic marketing system wherein display scales are provided with means for sensing the weight of articles therein, while card readers are associated with the scales to identify customers selecting the articles. Data processing equipment provides the customer with a printout of the articles and the cost.

U.S. Pat. No. 3,935,933, issued to T. Tanaka et al. on Feb. 3, 1976, discloses an automatic article vending machine that uses a card having a predetermined monetary value which is decreased by the value of the article purchased with the card.

U.S. Pat. No. 4,068,213, issued to Y. Nakamura on Jan. 10, 1978, discloses a merchandise checkout system including a credit card reader operated by the customer. The credit card is encoded with an amount of money and a result is displayed and printed on a receipt and journal.

U.S. Pat. No. 4,521,677, issued to H. S. Sarwin on June 4, 1985, discloses a product control system for a supermarket which includes a bar code reader at the checkout terminal for reading bar codes that are displayed on the various shelves.

U.S. Pat. No. 4,583,083, issued to J. J. on Apr. 15, 1986, discloses a checkout s including means through which a shopper must pass for dispossessing the shopper of items for purchase, sensing means for detecting the items, cashier stations separated from the sensing means for printing the cost of the items and for receiving payment for the items, and a pickup area where the shopper picks up the items.

U.S. Pat. No. 4,583,619, issued to R. A. Fry on Apr. 22, 1986, discloses an automatic gate for a checkout lane which is controlled by the cash register lock key.

U.S. Pat. No. 4,676,343, issued to D. R. Humble et al. on June 30, 1987, discloses a self-service distribution system that includes a laser scanner for reading UPC labels on products presented to the scanner by the customer. The products go through a tunnel and are weighed to provide a printed list and a price to the customer who then pays the cashier.

U.S. Pat. No. 4,679,154, issued to D.M. Blanford on July 7, 1987, discloses a scanning control system for merchandise checkout that includes a scanning assembly, a display, a processor and a data terminal device.

U.S. Pat. No. 4,686,357, issued to S. Douno et al. on Aug. 11, 1987, discloses a method for confirming settled check cards and check card drawing apparatus which may be used to cash a check or to deposit in an account. The check card can be used with an automated teller machine (ATM) or with an on-line teller machine (OTM).

U.S. Pat. No. 4,731,575, issued to J. W. Sloan on Mar. 15, 1988, discloses a prepayment metering system using encoded purchase cards which the customer inserts into a card reader on the premises. The card reader is coupled to a processor based control device which records the amount and the rate of usage along with the customer account number.

And, U.S. Pat. No. 4,775,782, issued to B. M. Mergenthaler et al. on Oct. 4, 1988, discloses a checkout system including a scanner, display means, a keyboard, a card reader, and processing means enabling the customer to finalize and pay for the items.

SUMMARY OF THE INVENTION

The present invention relates to a cashierless checkout system which permits the checking out of consumer goods or merchandise in a supermarket or like business entity without the aid or benefit of a cashier or checkout clerk. More particularly, the present invention discloses a checkout system that includes a consumer goods entry terminal wherein goods to be purchased is scanned and a passcard is issued to the customer, a money receiving terminal wherein the passcard is interpreted and processed in a read/write section to pay for the scanned goods, and an exit gate control unit which checks the passcard and permits the customer to exit after correct payment for the scanned goods.

In accordance with the present invention, there is provided a cashierless checkout system comprising one or more consumer goods entry terminals, each including a scanning section for scanning code data displayed on the consumer goods, a displaying section, and a printing section for respectively displaying and printing the consumer goods code data thus scanned, and a passcard issuing section for issuing a passcard on which an identification number of the customer and an amount of money are recorded, one or more money receiving terminals which are separated from said consumer goods entry terminals and each money receiving terminal including a passcard read/write section for performing reading and/or writing operations of said passcard upon insertion thereof into said money receiving terminal, a money receiving section for receiving the amount of money for the scanned goods, a printer section for issuing a receipt and a display for displaying amount data and necessary expressions thereon, and for dispensing said passcard onto which money received data are written from said passcard read/write section after the reception of said amount of money, an exit gate control unit which is provided in the vicinity of an outlet of a checkout area and which includes a passcard checker for checking said passcard to determine whether or not the amount of money is received and an exit gate controller for controlling an exit gate so as to enable the customers to exit under the control of said passcard checker, and a control and processing unit which is coupled to said consumer goods entry terminals, said money receiving terminals, and said exit gate control unit so as to control the operations of said consumer goods entry terminals, said money receiving terminals, and said exit gate control unit thus coupled therewith and to store sold goods data for arithmetic operation, whereby the money receiving operation is ensured by enabling the passing of customers through said separately provided consumer goods entry terminals, said money receiving terminals and said exit gate control unit with the use of said passcard.

In view of the above discussion, a principal object of the present invention is to provide a checkout system without the aid or benefit of a cashier or a checkout clerk.

Another object of the present invention is to provide a checkout system which includes goods scanning terminals, separate money receiving terminals and an exit gate enabling customers to exit from the checkout area after correct payment of money for the purchase of goods.

An additional object of the present invention is to provide a checkout system including goods scanning terminals, money receiving terminals and control means coupled to said goods scanning terminals and to said money receiving terminals to enable exit of said customers after payment for the purchased goods.

A further object of the present invention is to provide a cashierless checkout system in a checkout area wherein the customer's entry operation of consumer goods is separated from the money receiving operation and the money received is ensured with the use of passcards which permit only those customers who have paid the correct amount for their scanned goods to pass through the exit gate provided at the exit of the checkout area.

Additional advantages and features of the present invention will become apparent and fully understood from a reading of the following description taken together with the annexed drawing.

DESCRIPTION OF THE PREFERRED EMBODIMENT

Figure 1:
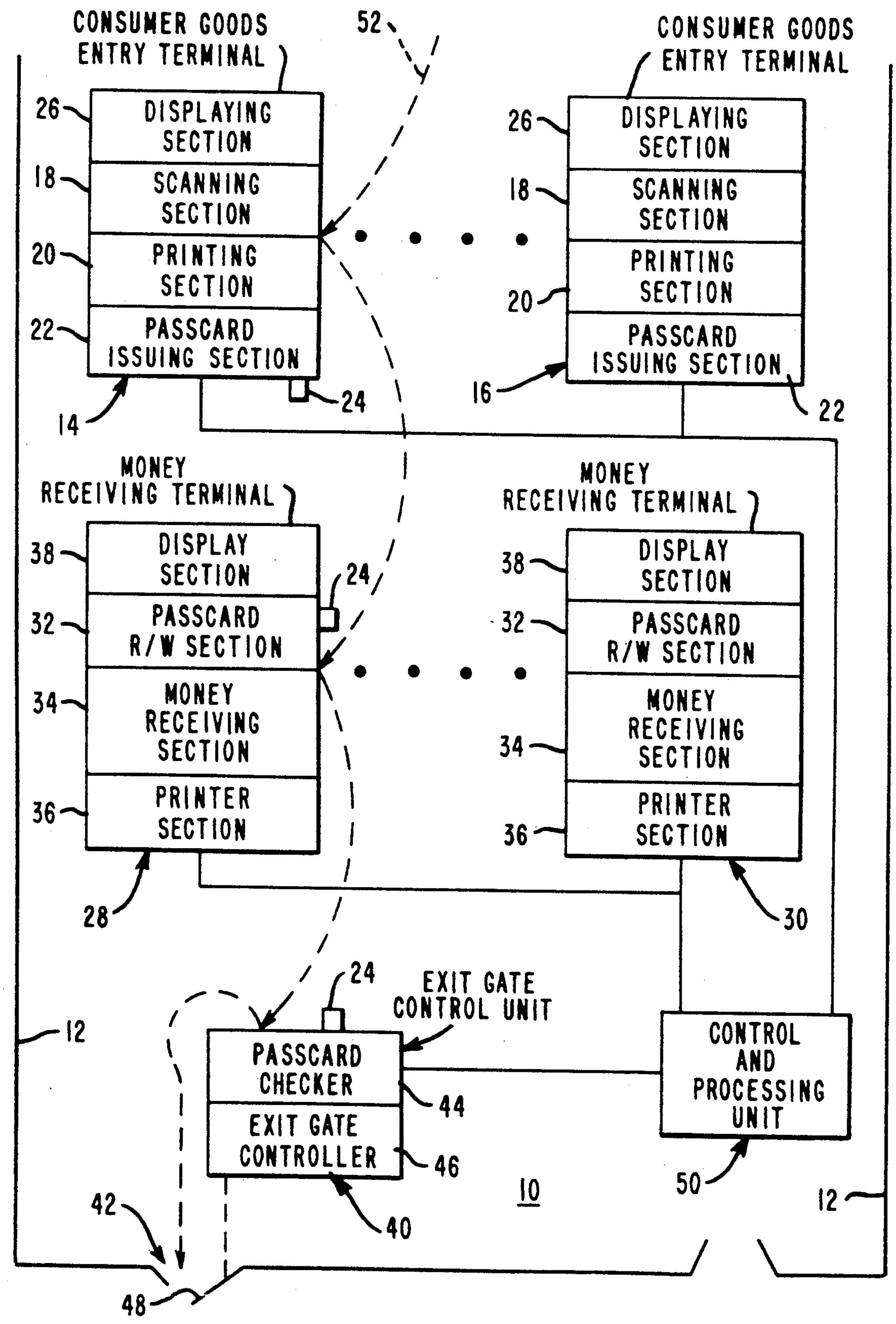
FIG. 1 is a block diagram showing the structure of a cashierless checkout system in accordance with an embodiment of the present invention.

A preferred embodiment of the present invention will be described with reference to the accompanying drawings, wherein FIG. 1 shows a schematic arrangement of the structure of the cashierless checkout system for use in a store or like business entity. The checkout area 10 in the store is illustrated as being that area within the boundary of the heavy solid line 12. A plurality of consumer goods entry terminals, as 14, 16, are located at the entrance to the checkout area 10 for the convenience of the customers who have selected goods or merchandise for purchase. Each of the entry terminals 14, 16 includes a scanning section 18 conveniently located for scanning consumer goods, a printing section 20 for printing data corresponding to the consumer goods which are scanned, and a passcard issuing section 22 for issuing passcards 24 to the customers. The passcards 24 include information which gives the total amount of the scanned goods and the customers' identification numbers. A displaying section 26, also placed in a convenient location, provides the customer with information concerning the scanned goods and the prices thereof.

A plurality of money receiving terminals, as 28, 30, are, separated in physical location from the consumer goods entry terminals 14, 16. Each of the money receiving terminals 28, 30 includes a passcard Read/Write (R/W) section 32 for performing reading/ writing operations of passcards 24 issued from any of the consumer goods entry terminals 14, 16. Each of the money receiving terminals 28, 30 includes a money receiving section 34 through which the customers pay money for their scanned goods and receive their change, a printer section 36 for issuing receipts to the customers, and a display section 38 for viewing of the transactions by the customers.

An exit gate control unit 40 is provided in the vicinity of a customer outlet 42 of the checkout area 10 and which control unit includes a passcard checker 44 for reading and collecting the passcards 24 which are issued from the passcard issuing section 22 of the consumer goods entry terminals 14, 16 and into which data is written indicating that the money for the scanned goods is received in the money receiving section 34 of the money receiving terminals 28, 30. An exit gate controller 46 of the control unit 40 operates to open a gate 48 in accordance with money received data read out from the passcards 24 to enable the customers to pass through the gate 48 and to the outside of the checkout area 10.

A control and processing unit 50 is provided for controlling the operations of the consumer goods entry terminals 14, 16, the money receiving terminals 28, 30, and the exit gate control unit 40, and also for processing and storing sold goods data, unpaid goods data, settlement data and the like.

Next, the checkout operation and procedure of the cashierless checkout system according to the present invention will be described with reference to FIG. 1. In the drawing, the dotted line 52 indicates a path through the checkout area 10 and along which a customer advances to perform the various checkout operations. For the sake of convenience, it is assumed that the customer uses the consumer goods entry terminal 14 and the money receiving terminal 28, such terminals showing issuance of a passcard 24 at the passcard issuing section 22 and the use of the passcard at the passcard R/W section 32.

The customer initiates and enables scanning of the bar codes on the merchandise or goods through the scanning section 18 of the consumer goods entry terminal 14. An automatic scanner which permits automatic scanning of the bar codes may be used, such as an ACM 650 Cashier Station which is available from Check Robot Co., Ltd. The data thus scanned by the scanning section 18 is sent to the control and processing unit 50 to be processed and stored therein, to be displayed on the displaying section 26 of the consumer goods entry terminal 14, and to be printed on a scanned goods detailed sheet (not shown) by the printing section 20 of the terminal 14. At the completion of scanning of all consumer goods, a final key (not shown) is depressed by the customer to send a finalized signal to the control and processing unit 50 which, in turn, receives the finalized signal to calculate the total amount of the consumer goods as seen by the scanning section 18 and to store the amount thus calculated in an unpaid goods data file. The finalized signal also enables the control and processing unit 50 to actuate the passcard issuing section 22 to issue a passcard 24 in which the customer's ID number and the total amount of the consumer goods are magnetically recorded and also to actuate the printing section 20 to print the total amount of the consumer goods on the scanned goods detailed sheet to be issued to the customer.

Next, the customer goes to the money receiving terminal 28 with the scanned goods detailed sheet and with the passcard 24 issued from the issuing section 22 of the consumer goods entry terminal 14 to pay the money for the scanned goods. When the customer inserts the passcard 24 into the R/W Section 32 of the money receiving terminal 28, the customer's ID number and the total amount of money owed for the scanned goods are read and sent to the control and processing unit 50 to be collated therein and compared with the identification (ID) number and the total amount of money stored therein and displayed on the display section 38 of the terminal 28. The customer pays the correct amount of money for the scanned goods by putting cash into the money receiving section 34 of the terminal 28 without the aid of a salesclerk or the use of a prepaid card or the like. The money receiving section 34 discharges or dispenses any necessary change in the overall transaction. At the completion of the money receiving operation, the control and processing unit 50 stores the result of the transaction in a money received data file, actuates the passcard R/W section 32 to dispense the passcard 24 (or a passcard which may be different from the above-mentioned passcard) on which the money received is recorded, and then actuates the printer section 36 of terminal 28 to issue a receipt of the scanned goods to the customer.

The customer then goes to the exit gate control unit 40 and inserts the passcard 24 into the passcard checker 44. When the passcard checker 44 confirms that the correct amount of money is received, the passcard 24 is withdrawn and a command signal is sent from the passcard checker 44 to the exit gate controller 46 of control unit 40 to open the gate 48 to enable only those customers to pass therethrough who have paid the correct amount of money for their scanned goods.

The individual terminals and the units employed in the cashierless checkout system according to the present invention will be more concretely described with reference to FIGS. 2A, 2B, 3A, 3B, 4A and 4B. Along with the control and processing unit 50, various other control units (not shown) such as a personal computer, an office computer and the like may be employed in accordance with the overall number of consumer goods entry terminals 14, 16 and the number of money receiving terminals 28, 30. In this embodiment, it is preferred that an office computer is employed. The structure of such office computer is well known in the art, so that the description thereof is omitted here and only the operation thereof will be described with reference to a flow chart of the drawing.

Figure 2A:
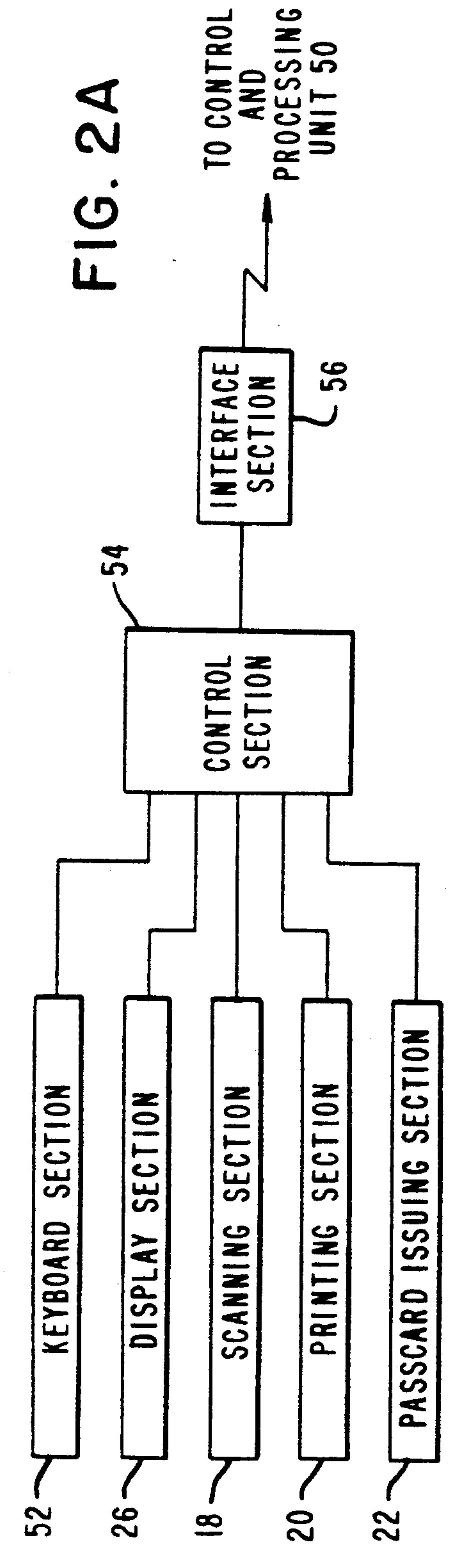
FIG. 2A is a block diagram of the structure of the consumer goods entry terminal.
Figure 2B:
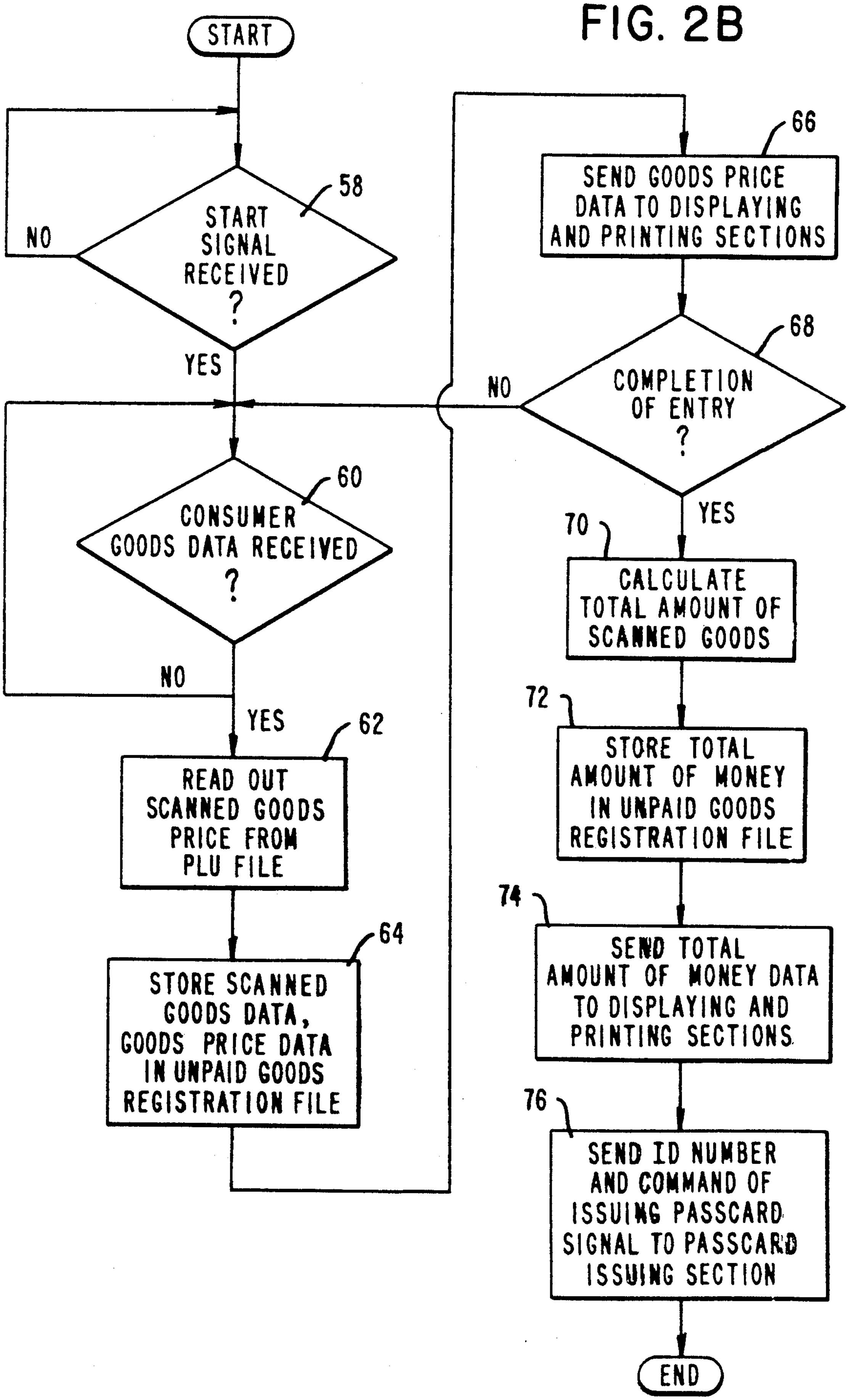
FIG. 2B is a flow chart of the operation of the control and processing unit in relation to the consumer goods entry terminal shown in FIG. 2A.

The consumer goods entry terminal 14 will be described in more detail relative to the operation thereof. FIG. 2A shows the structure of the consumer goods entry terminal 14 and FIG. 2B is a flow chart of the data processing operation from the consumer goods entry terminal 14 to the control and processing unit 50. The consumer goods entry terminal 14 consists of a keyboard section 52, the displaying section 26, the scanning section 18, the printing section 20, the passcard issuing section 22, a control section 54 and an interface section 56 coupled to the control and processing unit 50.

When a customer depresses a start key (FIG. 2B) on the keyboard section 52 (FIG. 2A) in order to start a scanning operation for the registration of the goods to be purchased, a start signal is sent from the keyboard section 52 (FIG. 2A) to the control section 54 which, in turn, transmits the start signal thus received to the control and processing unit 50 via the interface section 56. The control and processing unit 50 receives the start signal and waits until a consumer goods data signal is transmitted thereto (Blocks 58 and 60 in FIG. 2B). Then, the customer initiates and enables scanning of the goods to be purchased by means of the scanning section 18. Consumer goods data is read out by the scanning section 18 and is sent to the control section 54 and then to the control and processing unit 50 through the interface section 56. The control and processing unit 50 receives the consumer goods data (Block 60) and retrieves the price of one of the purchased goods from a Price Look Up (PLU) file and reads out the price of the scanned goods (Block 62). The price of one of the scanned goods thus read out (the goods price data) is stored in an unpaid goods registration file of the control and processing unit 50 together with the store scanned goods data thus received (Block 64) and then such goods price data is sent to the consumer goods entry terminal 14 (Block 66). The control section 54 of the consumer goods entry terminal 14 receives the goods price data and sends such data to the displaying section 26 and to the printing section 20. The displaying section 26 displays the price of the scanned goods based on the goods price data from the control section 54 and the printing section 20 prints the price of the scanned goods on a scanned goods detailed sheet (Block 66). All of the remaining goods to be are scanned by the scanning section 18 and are stored in the unpaid registration file of the control and processing unit 50 in the same manner as described above.

The customer then depresses a final key on the keyboard section 52 at the completion of the scanning operation and of the registration of the store scanned goods. When the final key is depressed, a registration final signal is output from the keyboard section 52 and is sent to the control and processing unit 50 through the control section 54 and through the interface section 56. The control and processing unit 50 receives the registration final signal and calculates the total price amount of the store scanned goods (Blocks 68 and 70). The total amount-of-money data is stored in the unpaid goods registration file of the control and processing unit 50 and also is sent to the consumer goods entry terminal 14 (Blocks 72 and 74). The control section 54 of the consumer goods entry terminal 14 receives the record of the total amount of money and outputs data thereon to the displaying section 26 and the printing section 20 of terminal 14. The total amount of money is displayed on the displaying section 26 for viewing by the customer and also is printed on the scanned goods detailed sheet by the printing section 20. Then, the control and processing unit 50 sends the identification (ID) number of the customer and a command for issuing a passcard signal to the consumer goods entry terminal 14 (Block 76). The control section 54 of the consumer goods entry terminal 14 receives the ID number and the command for issuing the passcard signal and outputs the total amount of money owed for the store scanned goods to the passcard issuing section 22 together with the ID number and the command signal thus received. The passcard issuing and dispenses or passes out a passcard 24 stored therewithin and magnetically records the ID number and the total amount of money thereon. The customer receives the passcard 24 and goes to the money receiving, terminal 28 for payment of the store scanned goods.

Figure 3A:
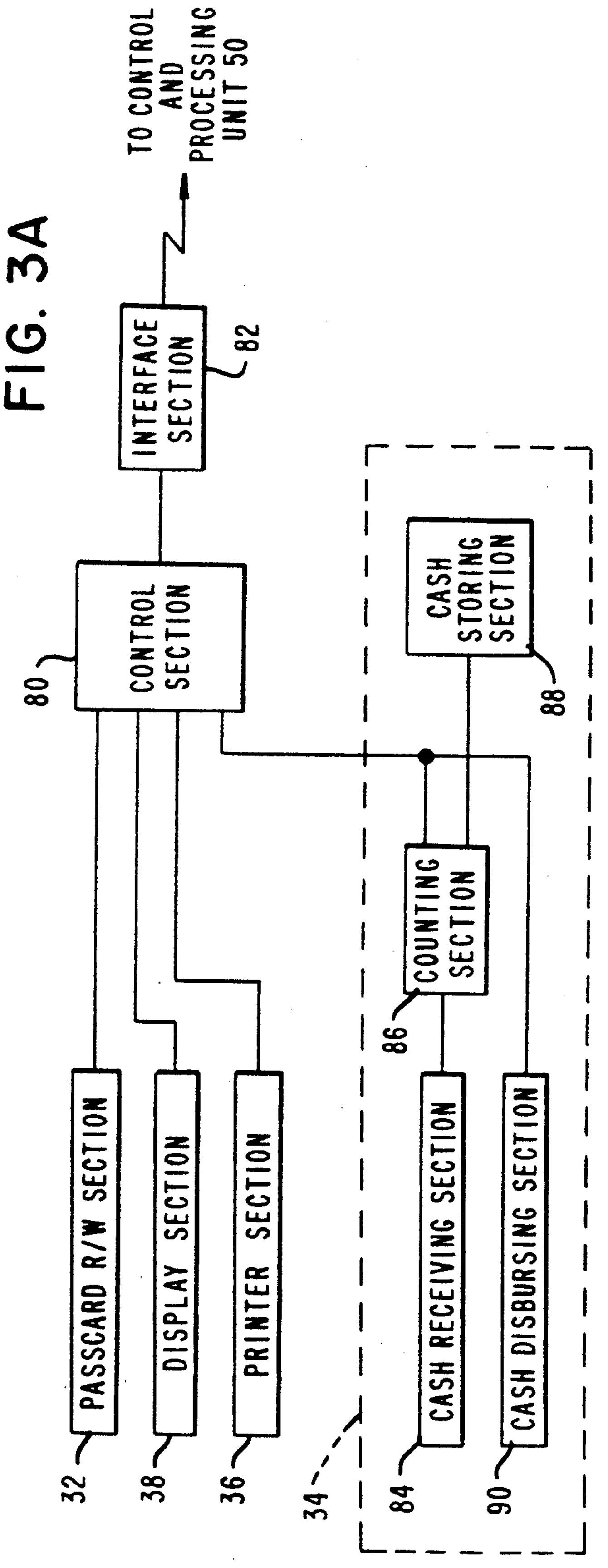
FIG. 3A is a block diagram of the structure of the money receiving terminal.
Figure 3B:
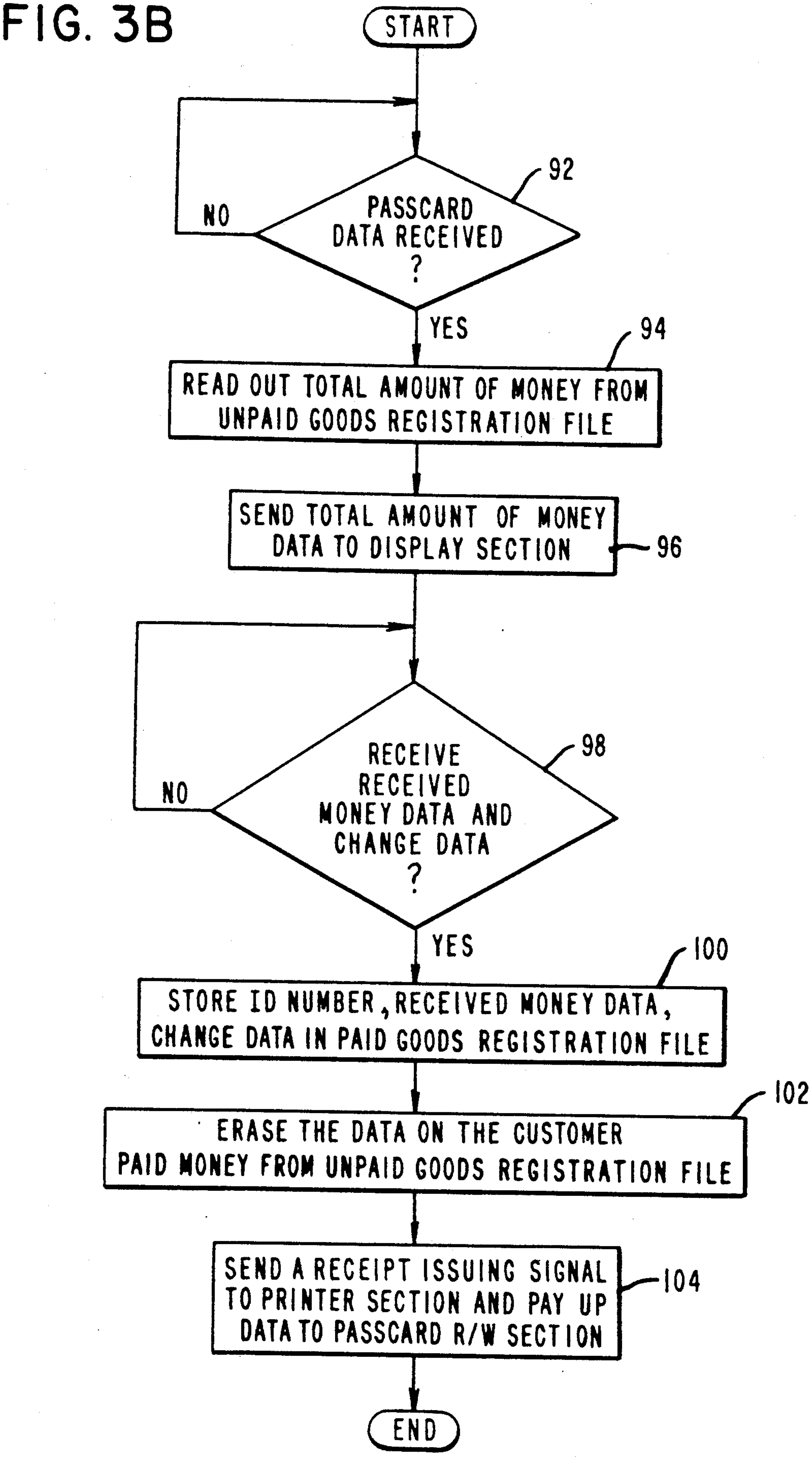
FIG. 3B is a flow chart of the operation of the control and processing unit in relation to the money receiving terminal shown in FIG. 3A.

The money receiving terminal 28 will be described in more detail relative to the operation thereof. FIG. 3A shows the structure of the money receiving terminal 28 and FIG. 3B is a flow chart of the operation of the control and processing unit 50. As shown in FIG. 3A, the money receiving terminal 28 includes the passcard read/write (R/W) section 32, the display section 38, the money receiving section 34, the printer section 36, a control section 80 and an interface section 82 coupled to the control and processing unit 50. The money receiving section 34 includes a cash receiving section 84, a counting section 86, a cash storing section 88 and a cash disbursing section 90 coupled along with the counting section 86 to the control section 80.

When the customer inserts the passcard 24 into the passcard R/W section 32 (FIG. 3A) at the completion of the scanning operation and registration of the store scanned goods, the passcard R/W section 32 reads out content data that is recorded on the passcard 24 and sends the data thus read out (the passcard data) to the control and processing unit 50 through the control section 80 and the interface section 82. The control and processing unit 50 receives the passcard data from the money receiving terminal 28, reads out the total amount of money from the unpaid goods registration file of the control and processing unit 50 which is based on the ID number in the passcard data (Blocks 92 and 94 in FIG. 3B) and sends the total amount of money data thus read out to the money receiving terminal 28 (Block 96). The control section 80 of the money receiving terminal 28 outputs the total amount of money data thus received to the display section 38 to be displayed to the customer.

When the customer pays money for the store scanned goods to the money receiving section 34, the cash receiving section 84 receives bills and coins and feeds the money to the counting section 86 which, in turn, counts the bills and coins received and then calculates the total amount of money that the customer has paid. The counting section 86 sends received cash data on the total amount of the paid money thus calculated to the control and processing unit 50 through the control section 80 and the interface section 82 and also feeds the bills and coins thus counted to the cash storing section 88 to be stored therein. The control section 80 calculates the difference (change) between the total amount of money to be paid which is sent from the control and processing unit 50 through the interface section 82 and the total amount of money received which is sent from the counting section 86. In case change is made, the control section 80 sends the amount of change and a change disbursing signal to the cash disbursing section 90 and displays the amount of change on the display section 38. Further, the control section 80 sends change data to the control and processing unit 50 through the interface section 82. The control and processing unit 50 receives the received money data and the change data from the money receiving terminal 28 (Block 98) and stores the customer's ID number, the received money data, and the change data in the paid goods registration file (Block 100) and erases the data on the customer who paid money for the store scanned goods from the unpaid goods registration file (Block 102). Then, the control and processing unit 50 sends a receipt issuing signal and a passcard reissuing signal to the money receiving terminal 28 (Block 104). The control section 80 of the money receiving terminal 28 receives the receipt issuing signal and the passcard reissuing signal and sends print data (the total amount of money to be paid, the total amount of money received, and the amount of change) to the printer section 36 and also sends pay up data indicating that the money has already been paid to the passcard R/W section 32. The printer section 36 receives the print data from the control section 80 and prints the data on a receipt to be issued to the customer. The passcard R/W section 32 receives the pay up data from the control section 80 and magnetically records the data on the passcard 24 to be issued to the customer. The customer receives the receipt and the pay up passcard, and the change from the cash disbursing section 90 and then goes to the exit gate control unit 40.

Figure 4A:
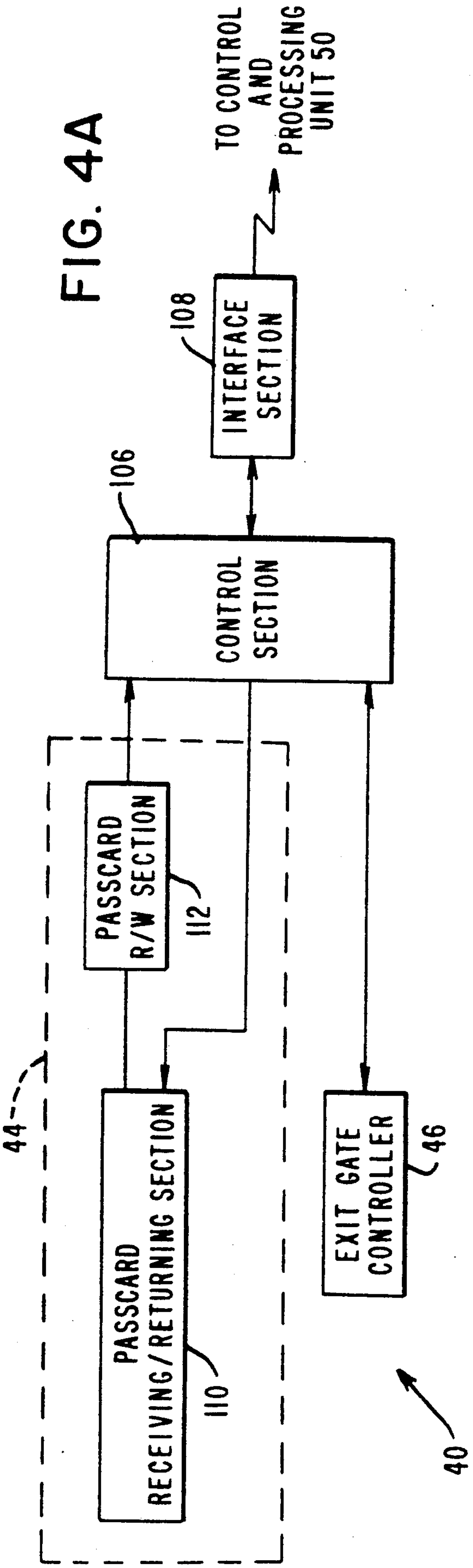
FIG. 4A is a block diagram of the structure of the exit gate control unit.
Figure 4B:
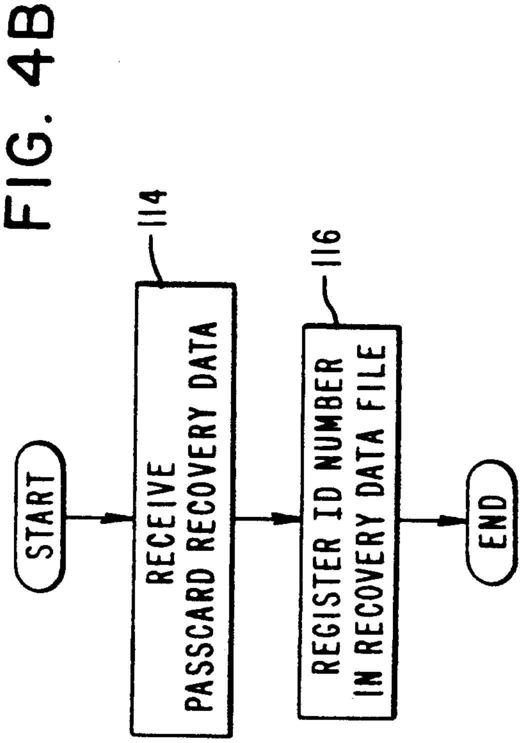
FIG. 4B is a flow chart of the operation of the control and processing unit in relation to the exit gate control unit shown in FIG. 4A.

The exit gate control unit 40 provides the controls necessary to enable the customer to pass from the checkout area 10 and through the exit gate 48 (FIG. 1). FIG. 4A shows the structure of the exit gate control unit 40 and FIG. 4B is a flow chart of the operation of the control and processing unit 50 in relation to the exit gate control unit 40. As shown in FIG. 4A, the exit gate control unit 40 includes the passcard checker 44, the exit gate controller 46, a control section 106 and an interface section 108 coupled to the control and processing unit 50. The passcard checker 44 includes a passcard receiving/returning section 110 and a passcard R/W section 112.

When the customer inserts the passcard 24 into the passcard checker 44 of the exit gate control unit 40 at the completion of payment for the store scanned goods, the passcard receiving section 110 feeds the passcard 24 to the passcard R/W section 112 which receives the passcard 24, reads out the data magnetically recorded thereon and outputs the data thus read out to the control section 106. Then, the control section 106, upon receipt of the data on the passcard 24, recognizes the pay up data in the read out data, sends a permission signal for gate opening to the exit gate controller 46, and simulataneously therewith, transmits passcard recovery data, including the ID number of the customer from whom the passcard 24 has been recovered, to the control and processing unit 50 through the interface section 108 of the exit gate control unit 40. The control and processing unit 50 receives the passcard recovery data thus transmitted to register the customer's ID number in a recovery data file (Blocks 114 and 116 in FIG. 4B). The exit gate controller 46 receives the permission signal for gate opening to output a gate open signal to open the gate 48 through which the customer can exit from the checkout area 10. The gate 48 is opened by the gate open signal and the customer goes outside the checkout area 10 through the gate 48 with the store scanned goods.

However, on the other hand, when no pay up data is found on the passcard 24, the control section 106 outputs a passcard return signal to the passcard receiving and returning section 110 (FIG. 4A) which discharges the passcard 24 through an outlet thereof upon receiving the passcard return signal. The system may be so designed as to announce by voice that the customer is to pay up the money or to display an amount owed when no pay up data is found. In this case, the customer can not go outside the checkout area 10 until he goes to the money receiving terminal 28 with the passcard 24 thus returned and pays up the correct amount of money.

There may be provided a plurality of gates such as those used at gateways to a wicket or a recreation garden through which the customers can go in and out one by one. Alternatively, the gate 48 may be constituted by a conventional door, wherein a plurality of customers can pass through the gate 48 at the same time, as long as measures are taken not to pass a customer who does not pay up the owed money. As one of the proposed measures, the system may be so constructed as to detect a person who intends to pass through the gate 48 with a passcard 24 and thereby raise an alarm of the fact that a person who has not paid the correct amount of money still has the passcard 24 in his or her possession. The system can be constructed such that an antenna of a predetermined configuration is printed on the passcard 24 in the form of a sheet and the antenna is sensed when the passcard passes through the gate 48. This antenna sensing technique is well known in the art, so that the description thereof is omitted.

In addition, there may be provided separate paths and exits (not shown) which permit a person who does not purchase any goods to go outside without passing in the path 52 along the consumer goods entry terminals 14, 16 and the money receiving terminals 28, 30 in the checkout area 10.

It is thus seen that herein shown and described is a cashierless checkout system having an advantage that jamming or crowded conditions in the checkout area can be relieved by separating the entry and scanning of scanned goods from the payment of the money. In addition, a passcard is issued to each customer to enable the customer to pass through the gate provided at the exit of the checkout area. The system permits the customer who has paid the correct amount of money for the store scanned goods to go outside the checkout area and thereby ensure that the money has been received for the scanned goods. Further, the number of consumer goods entry terminals and the number of money receiving terminals to be installed can be separately and freely selected in accordance with various conditions such as the type of store and experience of customers in operating the various terminals. In addition, a customer can selectively use a disengaged terminal in certain instances which may include practice or training in the operations of the system, so that the terminals can be used effectively. Accordingly, there is provided a cashierless checkout system by which the checking out operation is effectively and advantageously performed.

The structure and arrangement of the present invention enable the accomplishment of the objects and advantages mentioned above, and while a preferred embodiment of the invention has been disclosed herein, variations thereof may occur to those skilled in the art. It is contemplated that all such variations not departing from the spirit and scope of the invention hereof are to be construed in accordance with the following claims.

What is claimed is:

1. A cashierless checkout system in a checkout area comprising a plurality of consumer goods entry terminals each including a scanning section for scanning code data indicated on consumer goods to be purchased, a displaying section and a printing section for displaying and for printing information corresponding to the consumer goods code data thus scanned, and an issuing section for issuing a passcard on which are recorded an identification number of a customer and an amount of money owed corresponding to the value of the scanned goods, a plurality of money receiving terminals which are separated from said consumer goods entry terminals, each of said money receiving terminals including a passcard read/write section for performing reading and writing of data on said passcard upon insertion thereof into said money receiving terminal, a money receiving section for receiving an amount of money for the scanned goods, a printer section for issuing a receipt, and a display section for displaying amount data and other information thereon, said passcard being dispensed from said money receiving terminal and said passcard further including money receiving data written from said passcard read/write section after the reception of said received amount of money, an exit gate control unit which is provided in the vicinity of an exit of said checkout area and including a passcard checker for checking said passcard to check whether or not the amount of money received is equal to the amount of money owed and an exit gate controller for controlling an exit gate under the control of said passcard checker to enable customers to pass through said exit gate, and a control and processing unit coupled to said consumer goods entry terminals, to said money receiving terminals and to said exit gate control unit to control the operations of said terminals and said control unit thus coupled therewith and to store sold goods data, whereby the reception of said amount of money owed is ensured by checking said passcard and enabling the customer to pass through said checkout area and past said consumer goods entry terminals, said money receiving terminals and said exit gate control unit.

2. The checkout system of claim 1 wherein each of said consumer goods entry terminals includes a control section coupled to said passcard issuing section and to said control and processing unit for outputting the ID number of a customer, for outputting data on the amount of money owed for the scanned goods as calculated by said control and processing unit, and for outputting a signal to said passcard issuing section to issue a passcard.

3. The checkout system of claim 1 wherein each of said purchased goods entry terminals includes a keyboard section to enable said scanning section.

4. The checkout system of claim 1 wherein each of said money receiving terminals includes a control section coupled to said passcard read/write section and to said control and processing unit for outputting data on the amount of money owed for the scanned goods as read out in said passcard R/W section.

5. The checkout system of claim 4 wherein said money receiving section includes a cash receiving section for receiving cash, a counting section coupled to said cash receiving section and to said control section for counting the cash received from the customer and for sending data on such cash received to the control and processing unit, a cash storing section coupled to said counting section for storing cash received therefrom, and a cash disbursing section coupled to said counting section and to said control section for disbursing the difference in cash between the money received and the money owed.

6. A method of checking out goods in an automated system having a plurality of entry terminals, a plurality of money receiving terminals, an exit gate control unit and a control and processing unit comprising the steps of:

scanning coded data displayed on the goods at one of the entry terminals, displaying information corresponding to the coded data and printing the information for use by a customer, issuing a read/write passcard having customer identification and an amount of money recorded thereon corresponding to the value of goods that have been scanned, reading the passcard at one of the money receiving terminals to initiate the payment of money for the scanned goods, inserting money for said scanned goods into said one money receiving terminal, recording the amount of inserted money onto said passcard, conveying information relative to the coded data on said goods to the control and processing unit corresponding to the amount and price of scanned goods and storing the information in such unit, checking the passcard to determine whether the correct amount of money has been paid for the scanned goods, and enabling the exit gate control unit to allow the customer to pass through the exit gate upon assurance that payment has been made for the scanned goods.

7. The method of claim 6 including the step of operating a keyboard at the entry terminal to enable scanning the coded data.

8. The method of claim 6 including the steps of receiving money for the scanned goods after conveying the coded data information, counting the money received, and disbursing any change in money received and money owed for the scanned goods at the money receiving terminal.

* * * * *